(12) United States Patent
Jin

(10) Patent No.: US 7,250,731 B2
(45) Date of Patent: Jul. 31, 2007

(54) PRIMARY SIDE CURRENT BALANCING SCHEME FOR MULTIPLE CCF LAMP OPERATION

(75) Inventor: Xiaoping Jin, Orange, CA (US)

(73) Assignee: Microsemi Corporation, Irvine, CA (US)

( * ) Notice: Subject to any disclaimer, the term of this patent is extended or adjusted under 35 U.S.C. 154(b) by 0 days.

(21) Appl. No.: 11/099,995

(22) Filed: Apr. 6, 2005

(65) Prior Publication Data

US 2005/0225261 A1    Oct. 13, 2005

Related U.S. Application Data

(60) Provisional application No. 60/560,031, filed on Apr. 7, 2004.

(51) Int. Cl.
*H05B 41/16* (2006.01)

(52) U.S. Cl. ............... 315/282; 315/287; 315/279; 315/312; 315/324

(58) Field of Classification Search ........... 315/282, 315/287, 279, 276, 274, 277, 278, 285, 286, 315/289, 312, 324, 323
See application file for complete search history.

(56) References Cited

U.S. PATENT DOCUMENTS

| | | | |
|---|---|---|---|
| 2,429,162 A | 10/1947 | Russell et al. | |
| 2,440,984 A | 5/1948 | Summers | |
| 2,572,258 A | 10/1951 | Goldfield et al. | |
| 2,965,799 A | 12/1960 | Brooks et al. | |
| 2,968,028 A | 1/1961 | Eilichi et al. | |
| 3,141,112 A | 7/1964 | Eppert | |
| 3,565,806 A | 2/1971 | Ross | |
| 3,597,656 A | 8/1971 | Douglas | |
| 3,611,021 A | 10/1971 | Wallace | |
| 3,683,923 A | 8/1972 | Anderson | |
| 3,737,755 A | 6/1973 | Calkin et al. | |
| 3,742,330 A | 6/1973 | Hodges et al. | |
| 3,936,696 A | 2/1976 | Gray | |
| 3,944,888 A | 3/1976 | Clark | |

(Continued)

FOREIGN PATENT DOCUMENTS

EP    0647021 A1    9/1994

(Continued)

OTHER PUBLICATIONS

Williams, B. W., "Power Electronics Devices, Drivers, Applications and Passive Components". Second Edition, McGraw-Hill, 1992., Chapter 10, pp. 218-249.

(Continued)

*Primary Examiner*—Tuyet Thi Vo
(74) *Attorney, Agent, or Firm*—Knobbe, Martens, Olson & Bear LLP

(57) ABSTRACT

A backlight system drives multiple lamps using balanced groups of serially-connected lamp transformers. A plurality of lamp transformers is divided into multiple transformer groups. Primary windings of the lamp transformers are coupled in series in each transformer group. Lamps are coupled to secondary windings of the lamp transformers. The transformer groups are arranged in a parallel configuration. One or more balancing transformers couple the transformer groups to a common power source. The balancing transformers divide a common current from the common power source into multiple balanced currents for the respective transformer groups.

20 Claims, 8 Drawing Sheets

U.S. PATENT DOCUMENTS

| | | |
|---|---|---|
| 4,060,751 A | 11/1977 | Anderson |
| 4,353,009 A | 10/1982 | Knoll |
| 4,388,562 A | 6/1983 | Josephson |
| 4,441,054 A | 4/1984 | Bay |
| 4,463,287 A | 7/1984 | Pitel |
| 4,523,130 A | 6/1985 | Pitel |
| 4,567,379 A | 1/1986 | Corey et al. |
| 4,572,992 A | 2/1986 | Masaki |
| 4,574,222 A | 3/1986 | Anderson |
| 4,622,496 A | 11/1986 | Dattilo et al. |
| 4,630,005 A | 12/1986 | Clegg et al. |
| 4,663,566 A | 5/1987 | Nagano |
| 4,663,570 A | 5/1987 | Luchaco et al. |
| 4,672,300 A | 6/1987 | Harper |
| 4,675,574 A * | 6/1987 | Delflache .................... 315/130 |
| 4,686,615 A | 8/1987 | Ferguson |
| 4,698,554 A | 10/1987 | Stupp |
| 4,700,113 A | 10/1987 | Stupp et al. |
| 4,761,722 A | 8/1988 | Pruitt |
| 4,766,353 A | 8/1988 | Burgess |
| 4,780,696 A | 10/1988 | Jirka |
| 4,847,745 A | 7/1989 | Shekhawat |
| 4,862,059 A | 8/1989 | Tominaga et al. |
| 4,893,069 A | 1/1990 | Harada et al. |
| 4,939,381 A | 7/1990 | Shibata |
| 5,023,519 A | 6/1991 | Jensen |
| 5,030,887 A | 7/1991 | Guisinger |
| 5,036,255 A | 7/1991 | McKnight et al. |
| 5,057,808 A | 10/1991 | Dhyanchand |
| 5,173,643 A | 12/1992 | Sullivan et al. |
| 5,349,272 A | 9/1994 | Rector |
| 5,434,477 A | 7/1995 | Crouse et al. |
| 5,475,284 A | 12/1995 | Lester et al. |
| 5,485,057 A | 1/1996 | Smallwood et al. |
| 5,519,289 A | 5/1996 | Katyl et al. |
| 5,539,281 A | 7/1996 | Shackle et al. |
| 5,557,249 A | 9/1996 | Reynal |
| 5,563,473 A | 10/1996 | Mattas et al. |
| 5,574,335 A | 11/1996 | Sun |
| 5,574,356 A | 11/1996 | Parker |
| 5,615,093 A | 3/1997 | Nalbant |
| 5,619,402 A | 4/1997 | Lin |
| 5,621,281 A | 4/1997 | Kawabata et al. |
| 5,652,479 A | 7/1997 | LoCascio et al. |
| 5,712,776 A | 1/1998 | Palara et al. |
| 5,754,012 A | 5/1998 | LoCascio |
| 5,818,172 A | 10/1998 | Lee |
| 5,822,201 A | 10/1998 | Kijima |
| 5,825,133 A | 10/1998 | Conway |
| 5,828,156 A | 10/1998 | Roberts |
| 5,892,336 A | 4/1999 | Lin et al. |
| 5,910,713 A | 6/1999 | Nishi et al. |
| 5,912,812 A | 6/1999 | Moriarty, Jr. |
| 5,914,842 A | 6/1999 | Sievers |
| 5,923,129 A | 7/1999 | Henry |
| 5,930,121 A | 7/1999 | Henry |
| 5,930,126 A | 7/1999 | Griffin et al. |
| 5,936,360 A | 8/1999 | Kaneko |
| 6,002,210 A | 12/1999 | Nilssen |
| 6,020,688 A | 2/2000 | Moisin |
| 6,028,400 A | 2/2000 | Pol et al. |
| 6,037,720 A | 3/2000 | Wong et al. |
| 6,038,149 A | 3/2000 | Hiraoka et al. |
| 6,040,662 A | 3/2000 | Asayama |
| 6,043,609 A | 3/2000 | George et al. |
| 6,049,177 A | 4/2000 | Felper |
| 6,072,282 A | 6/2000 | Adamson |
| 6,104,146 A | 8/2000 | Chou et al. |
| 6,108,215 A | 8/2000 | Kates et al. |
| 6,114,814 A | 9/2000 | Shannon et al. |
| 6,121,733 A | 9/2000 | Nilssen |
| 6,127,785 A | 10/2000 | Williams |
| 6,127,786 A | 10/2000 | Moisin |
| 6,137,240 A | 10/2000 | Bogdan |
| 6,150,772 A | 11/2000 | Crane |
| 6,169,375 B1 | 1/2001 | Moisin |
| 6,181,066 B1 | 1/2001 | Adamson |
| 6,181,082 B1 | 1/2001 | Moisin |
| 6,181,083 B1 | 1/2001 | Moisin |
| 6,181,084 B1 | 1/2001 | Lau |
| 6,198,234 B1 | 3/2001 | Henry |
| 6,198,236 B1 | 3/2001 | O'Neill |
| 6,198,238 B1 | 3/2001 | O'Neill |
| 6,215,256 B1 | 4/2001 | Ju |
| 6,218,788 B1 | 4/2001 | Chen et al. |
| 4,686,059 A1 | 6/2001 | Deflache |
| 6,259,615 B1 | 7/2001 | Lin |
| 6,281,636 B1 | 8/2001 | Okutsu et al. |
| 6,281,638 B1 | 8/2001 | Moisin |
| 6,307,765 B1 | 10/2001 | Choi |
| 6,310,444 B1 * | 10/2001 | Chang ........................ 315/282 |
| 6,316,881 B1 | 11/2001 | Shannon et al. |
| 6,320,329 B1 | 11/2001 | Wacyk |
| 6,323,602 B1 | 11/2001 | De Groot et al. |
| 6,344,699 B1 | 2/2002 | Rimmer |
| 6,362,577 B1 | 3/2002 | Ito et al. |
| 6,396,722 B2 | 5/2002 | Lin |
| 6,417,631 B1 | 7/2002 | Chen et al. |
| 6,420,839 B1 | 7/2002 | Chiang et al. |
| 6,433,492 B1 | 8/2002 | Buonauita |
| 6,441,943 B1 | 8/2002 | Roberts et al. |
| 6,445,141 B1 | 9/2002 | Kastner et al. |
| 6,459,215 B1 | 10/2002 | Nerone et al. |
| 6,459,216 B1 | 10/2002 | Tsai |
| 6,469,922 B2 | 10/2002 | Choi |
| 6,472,827 B1 | 10/2002 | Nilssen |
| 6,472,876 B1 | 10/2002 | Notohamiprodjo et al. |
| 6,486,618 B1 | 11/2002 | Li |
| 6,494,587 B1 | 12/2002 | Shaw et al. |
| 6,501,234 B2 | 12/2002 | Lin et al. |
| 6,509,696 B2 | 1/2003 | Bruning et al. |
| 6,515,427 B2 | 2/2003 | Oura et al. |
| 6,515,811 B2 | 2/2003 | Ikuhara et al. |
| 6,522,558 B2 | 2/2003 | Henry |
| 6,531,831 B2 | 3/2003 | Chou et al. |
| 6,534,934 B1 | 3/2003 | Lin et al. |
| 6,559,606 B1 | 5/2003 | Chou et al. |
| 6,570,344 B2 | 5/2003 | Lin |
| 6,628,093 B2 | 9/2003 | Stevens |
| 6,633,138 B2 | 10/2003 | Shannon et al. |
| 6,680,834 B2 | 1/2004 | Williams |
| 6,864,867 B2 | 3/2004 | Biebl |
| 6,717,371 B2 | 4/2004 | Klier et al. |
| 6,717,372 B2 | 4/2004 | Lin et al. |
| 6,765,354 B2 | 7/2004 | Klein |
| 6,781,325 B2 | 8/2004 | Lee |
| 6,784,627 B2 | 8/2004 | Suzuki et al. |
| 6,804,129 B2 | 10/2004 | Lin |
| 6,870,330 B2 | 3/2005 | Choi |
| 6,922,023 B2 | 7/2005 | Hsu et al. |
| 6,930,893 B2 | 8/2005 | Vinciarelli |
| 6,936,975 B2 | 8/2005 | Lin et al. |
| 2001/0036096 A1 | 11/2001 | Lin |
| 2002/0030451 A1 | 3/2002 | Moisin |
| 2002/0097004 A1 | 7/2002 | Chiang et al. |
| 2002/0135319 A1 | 9/2002 | Bruning et al. |
| 2002/0140538 A1 | 10/2002 | Yer |
| 2002/0145886 A1 | 10/2002 | Stevens |
| 2002/0171376 A1 | 11/2002 | Rust et al. |
| 2002/0180380 A1 | 12/2002 | Lin |
| 2002/0180572 A1 | 12/2002 | Kakehashi et al. |
| 2002/0181260 A1 | 12/2002 | Chou et al. |
| 2002/0195971 A1 | 12/2002 | Qian et al. |
| 2003/0001524 A1 | 1/2003 | Lin et al. |

| | | |
|---|---|---|
| 2003/0080695 A1 | 5/2003 | Ohsawa |
| 2003/0090913 A1 | 5/2003 | Che-Chen et al. |
| 2003/0117084 A1 | 6/2003 | Stack |
| 2003/0141829 A1 | 7/2003 | Yu |
| 2004/0032223 A1 | 2/2004 | Henry |
| 2004/0155596 A1 | 8/2004 | Ushijima |
| 2004/0257003 A1 | 12/2004 | Hsieh et al. |
| 2004/0263092 A1 | 12/2004 | Liu |
| 2005/0093471 A1 | 5/2005 | Jin |
| 2005/0093472 A1* | 5/2005 | Jin ............................ 315/177 |
| 2005/0093482 A1 | 5/2005 | Ball |
| 2005/0093483 A1* | 5/2005 | Ball ........................... 315/291 |
| 2005/0099143 A1 | 5/2005 | Kohno |
| 2005/0156539 A1 | 7/2005 | Ball |
| 2005/0162098 A1 | 7/2005 | Ball |
| 2005/0225261 A1 | 10/2005 | Jin |
| 2006/0022612 A1 | 2/2006 | Henry |

FOREIGN PATENT DOCUMENTS

| | | |
|---|---|---|
| JP | 06168791 A | 6/1994 |
| JP | 8-204488 | 8/1996 |
| TW | 554643 | 9/2003 |
| TW | 200524481 | 12/2003 |
| TW | 200501829 | 1/2005 |
| WO | WO 94/15444 | 7/1994 |

OTHER PUBLICATIONS

Bradley, D. A., "Power Electronics" 2nd Edition; Chapman & Hall, 1995; Chapter 1, pp. 1-38.

Dubey, G. K., "Thyristorised Power Controllers"; Halsted Press, 1986; pp. 74-77.

* cited by examiner

PRIMARY SIDE CURRENT BALANCING SCHEME FOR MULTIPLE CCF LAMP OPERATION

CLAIM FOR PRIORITY

This application claims the benefit of priority under 35 U.S.C. § 119(e) of U.S. Provisional Application No. 60/560,031, filed on Apr. 7, 2004, and entitled "A Primary Side Current Balancing Scheme for Multiple CCF Lamp Operation," the entirety of which is incorporated herein by reference.

BACKGROUND

1. Field of the Invention

The invention generally relates to current balancing and more particularly to using balanced groups of serially-connected transformers to balance current among multiple lamps in a backlight system.

2. Description of the Related Art

In liquid crystal display (LCD) applications, backlight is needed to illuminate the screen to make a visible display. With the increasing size of LCD panels (e.g., LCD television or large screen LCD monitor), cold cathode fluorescent lamp (CCFL) backlight systems may operate with multiple lamps to obtain high quality illumination for a display screen. One of the challenges to a multiple lamp operation is how to maintain substantially equal or controlled operating currents for the respective lamps, thereby yielding the desired illumination effect on the display screen, while reducing electronic control and power switching devices to reduce system cost. Some of the difficulties are discussed below.

The variation in operating voltage of a CCFL is typically around ±20% for a given current level. When multiple lamps are connected in parallel across a common voltage source, equal current sharing among the lamps is difficult to achieve without a current balancing mechanism. Moreover, lamps with higher operating voltages may not ignite after ignition of lamps with lower operating voltages.

In constructing a display panel with multiple lamps, it is difficult to provide identical surrounding conditions for each lamp. Thus, parasitic parameters for each lamp vary. The parasitic parameters (e.g., parasitic reactance or parasitic capacitance) of the lamps sometimes vary significantly in a typical lamp layout. Differences in parasitic capacitance result in different capacitive leakage current for each lamp at high frequency and high voltage operating conditions, which is a variable in the effective lamp current (and thus brightness) for each lamp.

One approach to control current sharing is to connect primary windings of transformers in series and to connect lamps across secondary windings of the transformers. Since the current flowing through the primary windings is substantially equal in such a configuration, the current through the secondary windings can be controlled by the ampere-turns balancing mechanism. In such a way, the secondary currents (or lamp currents) can be controlled by a common primary current regulator and the transformer turns ratios.

A limitation of the above approach occurs when the number of lamps, and consequently the number of transformers, increases. The input voltage is limited, thereby reducing the voltage available for each transformer primary winding as the number of lamps increases. The design of the associated transformers becomes difficult.

SUMMARY

In one embodiment of the present invention, a backlight system drives multiple lamps (e.g., fluorescent lamps or CCFLs) with accurate current matching and without the above-mentioned limitations using balanced groups of serial lamp transformers. A plurality of lamp transformers are divided into two or more serial groups and one or more balancing transformers balance the currents among the serial groups of lamp transformers. In one embodiment, a combination of one or more balancing transformers and multiple lamp transformers is used to interface multiple CCFLs to a common alternating current (AC) source (e.g., an inverter). For example, one or more CCFLs are coupled across each secondary winding of the respective lamp transformer. The lamp transformers are arranged in subgroups with primary windings of the lamp transformers connected in series in each subgroup. One or more separate balancing windings of the balancing transformers are also coupled in series with the series-connected primary windings in each subgroup of lamp transformers. The series combination of balancing windings and series-connected primary windings are coupled in parallel across the common AC source.

By connecting the primary windings in series in each subgroup of lamp transformers, output currents (or lamp currents) conducted by secondary windings of the lamp transformers in the same subgroup are forced equal by electromagnetic coupling mechanism provided that the lamp transformers have substantially the same transformer turns ratios. The number of lamp transformers in each subgroup is limited by the available input voltage of the AC source. At steady state operation, each primary winding in a subgroup of N lamp transformers sees approximately $1/N^{th}$ of the total input voltage. The total number of lamp transformers coupled to the common AC source can be increased by adding more subgroups of serially-connected lamp transformers and arranging the subgroups in a parallel configuration. The lamp currents among the different subgroups are balanced by the balancing transformers.

In one embodiment, a backlight system (or multi-lamp assembly) includes M transformer groups arranged in a parallel configuration and each transformer group includes at least two lamp transformers with serially-coupled primary windings. A plurality of lamp loads is respectively coupled to secondary windings of the lamp transformers. At least M-1 balancing transformers are coupled between the M transformer groups and a common power source (e.g., an AC voltage source or an AC current source). Each balancing transformer includes two balance windings and the serially-coupled primary windings of each transformer group are coupled in series with at least one balance winding to the common power source. The balancing transformers divide a common current supplied by the common power source into multiple branches of balanced currents for the respective transformer groups.

In one embodiment, each of the balance windings of the balancing transformers have approximately the same number of turns such that the serially-coupled primary windings of each transformer group conduct substantially identical currents. In another embodiment, the lamp transformers for a common transformer group have approximately equal transformer turns ratios such that their secondary windings conduct substantially identical currents. The lamp load coupled across each secondary winding of a lamp transformer can include one or more CCFLs coupled in a series or a parallel configuration.

In one application, two transformer groups are coupled in parallel to a common power source via a balancing transformer. The balancing transformer has a first balance winding coupled in a first polarity between the common power source and the first transformer group and a second balance winding coupled in a second polarity between the common power source and the second transformer group. The first polarity and the second polarity are opposite polarities. Coupling the balance windings in opposite (or reverse) polarities between the common power source and the respective transformer groups results in substantially no voltage drop across the balance windings due to magnetic flux when both balance windings are conducting substantially identical currents. Imbalances between the currents conducted by the balance windings generate magnetic flux in the core of the balancing transformer. The magnetic flux induces corresponding voltages across the balance windings which are in anti-phase relationship to correct the current imbalance.

In another application, more than two transformer groups are coupled in parallel to a common power source via a plurality of balancing transformers in a cascaded configuration. Each of the balancing transformers has two balance windings coupled in an anti-phase relationship between the common power source and the respective transformer groups. For example, a first balancing transformer has a first balance winding coupled in a first polarity between the common power source and a first transformer group. A second balance winding of the first balancing transformer is coupled in a second polarity and in series with a first balance winding of a second balancing transformer in a first polarity between the common power source and a second transformer group. Aside from the first and last transformer groups, each of the transformer groups is coupled in series with two serially-coupled and anti-phase balance windings from different balancing transformers to the common power source. The last transformer group is coupled in series with a second balance winding to the common power source.

In yet another application, each transformer group has a dedicated balancing transformer. The balancing transformers are arranged in a ring balancing configuration. For example, M balancing transformers have first balance windings respectively coupled between a common power source and M transformer groups. The M balancing transformers have second balance windings coupled in a serial closed loop to conduct a common loop current and thereby facilitate matched or controlled currents in the respective first balance windings. In one embodiment, a sense resistor is inserted in the serial closed loop to monitor the common loop current for current feedback or control. In another embodiment, a group fault detection circuit senses a rise in voltage amplitude across one or more of the second balance windings to detect fault conditions (e.g., open or shorted lamp loads) in the transformer groups. Fault conditions can also be detected by sensing voltage amplitude changes (e.g., increases) across primary windings of the lamp transformers.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate embodiments and are not intended to be limiting.

DETAILED DESCRIPTION OF EMBODIMENTS

Although particular embodiments are described herein, other embodiments, including embodiments that do not provide all of the benefits and features set forth herein, will be apparent to those of ordinary skill in the art.

Figure 1:
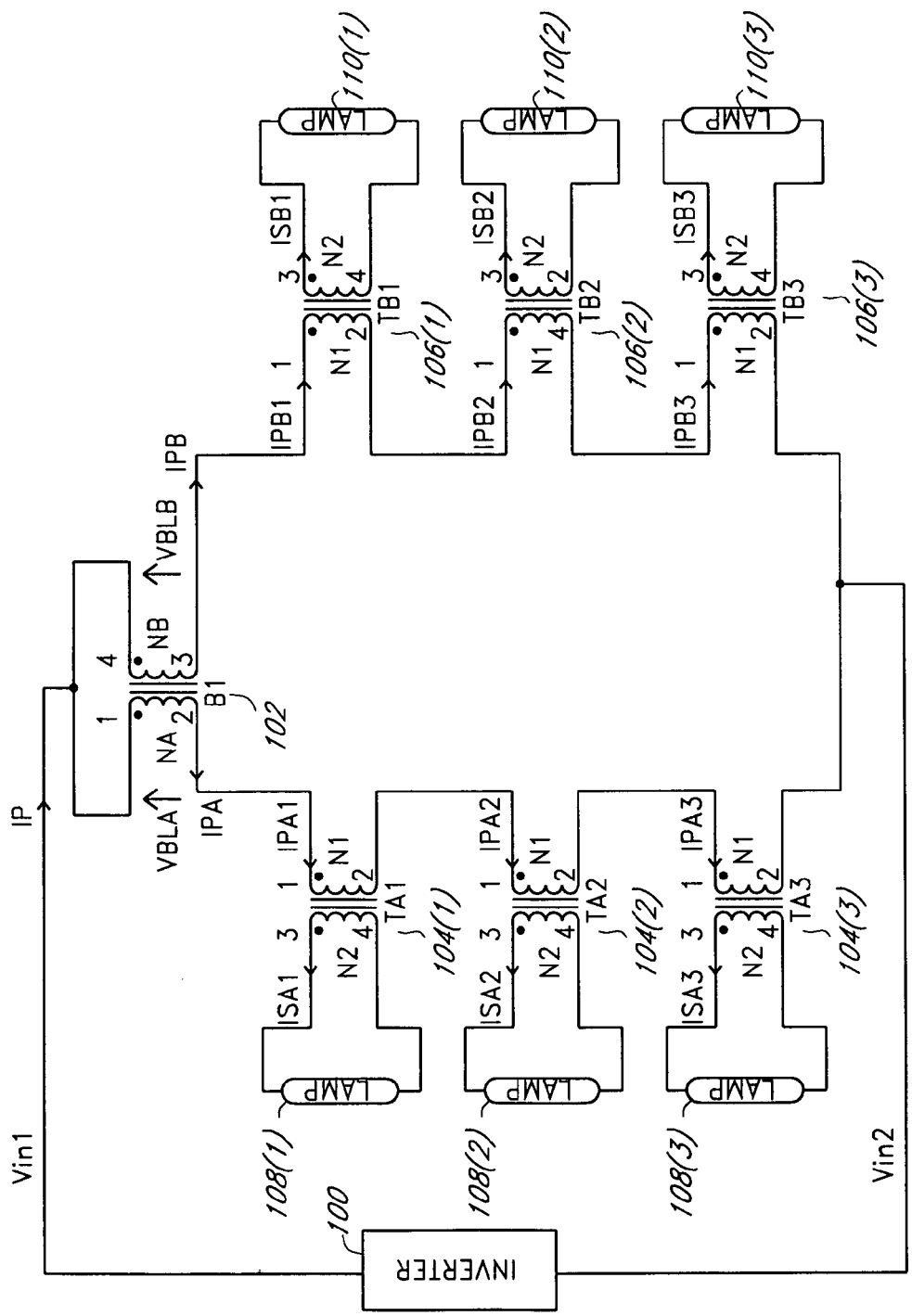
FIG. 1 illustrates one embodiment of balanced groups of serially-coupled lamp transformers using one balancing transformer for two transformer groups.

FIG. 1 illustrates one embodiment of balanced groups of serially-coupled lamp transformers using one balancing transformer (B1) 102 for two transformer groups. The balancing transformer 102 has two balance windings coupled in reverse polarity between an input node (Vin1) and the respective transformer groups. In one embodiment, an inverter 100 is coupled between the input node and a reference node (Vin2) to generate a voltage supply or a current supply. The voltage supply or the current supply provides a common AC current (IP) to the balancing transformer 102. The balancing transformer 102 divides the common AC current into two balanced currents (IPA, IPB). The first balanced current (IPA) is conducted by the first balance winding and the second balanced current (IPB) is conducted by the second balance winding.

In the embodiment shown in FIG. 1, six lamp transformers are divided into two transformer groups. The first transformer group (e.g., group A) consists of three lamp transformers (TA1, TA2, TA3) shown as lamp transformers 104(1)–104(3) (collectively the lamp transformers 104). The second transformer group (e.g., group B) also consists of three lamp transformers (TB1, TB2, TB3) shown as lamp transformers 106(1)–106(3) (collectively the lamp transformers 106). The primary windings of the lamp transformers 104 in group A are connected in series between the first balance winding and the reference node to conduct the first balanced current. Similarly, the primary windings of the lamp transformers 106 in group B are connected in series between the second balance winding and the reference node to conduct the second balanced current.

A first set of lamp loads shown as lamp loads 108(1)–108(3) (collectively the lamp loads 108) are coupled across respective secondary windings of the lamp transformers 104 and conduct respective secondary currents (ISA1–ISA3). A second set of lamp loads shown as lamp loads 110(1)–110(3) (collectively the lamp loads 110) are coupled across respective secondary windings of the lamp transformers 106 and conduct respective secondary currents (ISB1–ISB3). The lamp loads 108, 110 can include a variety of lamp configurations (e.g., a single lamp, two lamps connected in series, or multiple lamps connected in parallel).

In one embodiment, the lamp transformers 104, 106 in both transformer groups are substantially similar with approximately equal transformer turns ratios (N1/N2). Thus, the secondary currents (or output currents from the respective secondary windings) are substantially equal within each transformer group because of the serial connection of the primary windings.

$$ISA1=ISA2=ISA3=(N1/N2)\cdot IPA$$

$$ISB1=ISB2=ISB3=ISB=(N1/N2)\cdot IPB \qquad \text{Eqn. (1)}$$

With the above described relationship, if the balanced currents (IPA, IPB) flowing in the primary windings of the two transformer groups are equal, the output currents from the secondary windings of all six of the lamp transformers are equal. The balanced currents are substantially equal when the balance windings of the balancing transformer 102 have substantially equal number of turns (NA=NB).

If IPA=IPB

Then ISA1=ISA2=ISA3=ISB1=ISB2=ISB3 Eqn. (2)

The balance windings of the balancing transformer 102 have respective terminals commonly connected to the input node in reverse polarity. Thus, the two balance windings are configured in an anti-phase relationship. When the balanced currents (IPA, IPB) flow through the respective balance windings to the corresponding transformer groups (or transformer banks), the magnetic fields generated by these two balanced currents in the magnetic core of the balancing transformer 102 cancel each other. Thus, no magnetic flux is induced in the core of the balancing transformer 102 when the balanced currents (IPA, IPB) are substantially equal. Consequently, no voltage develops across the balance windings except for the resistive drop due to the current flow.

If the balanced currents (or primary currents) are not equal, the difference between the primary currents generates magnetic flux in the core of the balancing transformer 102. Consequently, the magnetic flux induces corresponding voltages across the balance windings. The induced voltages (VBLA, VBLB) are in anti-phase relation because of the anti-phase connection of the balance windings. The following equation describes the relation of the induced voltages in the balance windings under the imbalanced primary currents condition.

$$\Delta IP=IPA-IPB$$

$$\Phi=L\cdot\Delta IP$$

$$VBLA=-VBLB=d\Phi/dt=2\pi f\cdot L\cdot\Delta IP \qquad \text{Eqn.(3)}$$

In the above equations, $\Delta IP$ is the magnitude of the imbalanced current, $\Phi$ is the flux linkage, L is the self-inductance of the individual balance winding, f is the frequency of the common AC current, VBLA and VBLB are the induced voltages across the respective balance windings of the balancing transformer 102.

The induced voltages work as balancing voltages (or error voltages) to push the primary currents back to the balanced condition. For example, when IPA is greater than IPB, the induced voltage across the first balance winding (VBLA) is anti-phase to an input voltage while the induced voltage across the second balance winding (VBLB) is in-phase with the input voltage. Thus, VBLA works to reduce IPA while VBLB works to increase IPB until the balancing transformer 102 reaches an equilibrium point with IPA approximately equal to IPB.

A relatively small component of error current exists to induce a balancing voltage across the balance windings to maintain the primary currents at the equilibrium (or balancing) point. The magnitude of the error current is dependent on the self-inductance of the balance windings. Higher self-inductance results in less error current and vice versa. The above-described mechanism remains effective provided the magnetic core of the balancing transformer 102 is not saturated.

It should be noted that the number of lamp transformers in each serial group (or transformer group) is not limited to three as depicted in FIG. 1. It can be any number as long as the available voltage for each primary winding in the serial group is suitable for the intended application. The number of serial groups is not limited to two as depicted in FIG. 1. More serial groups of lamp transformers can be added in a parallel configuration and balanced with cascaded balancing transformers as illustrated in FIGS. 2A and 2B.

Figure 2A:
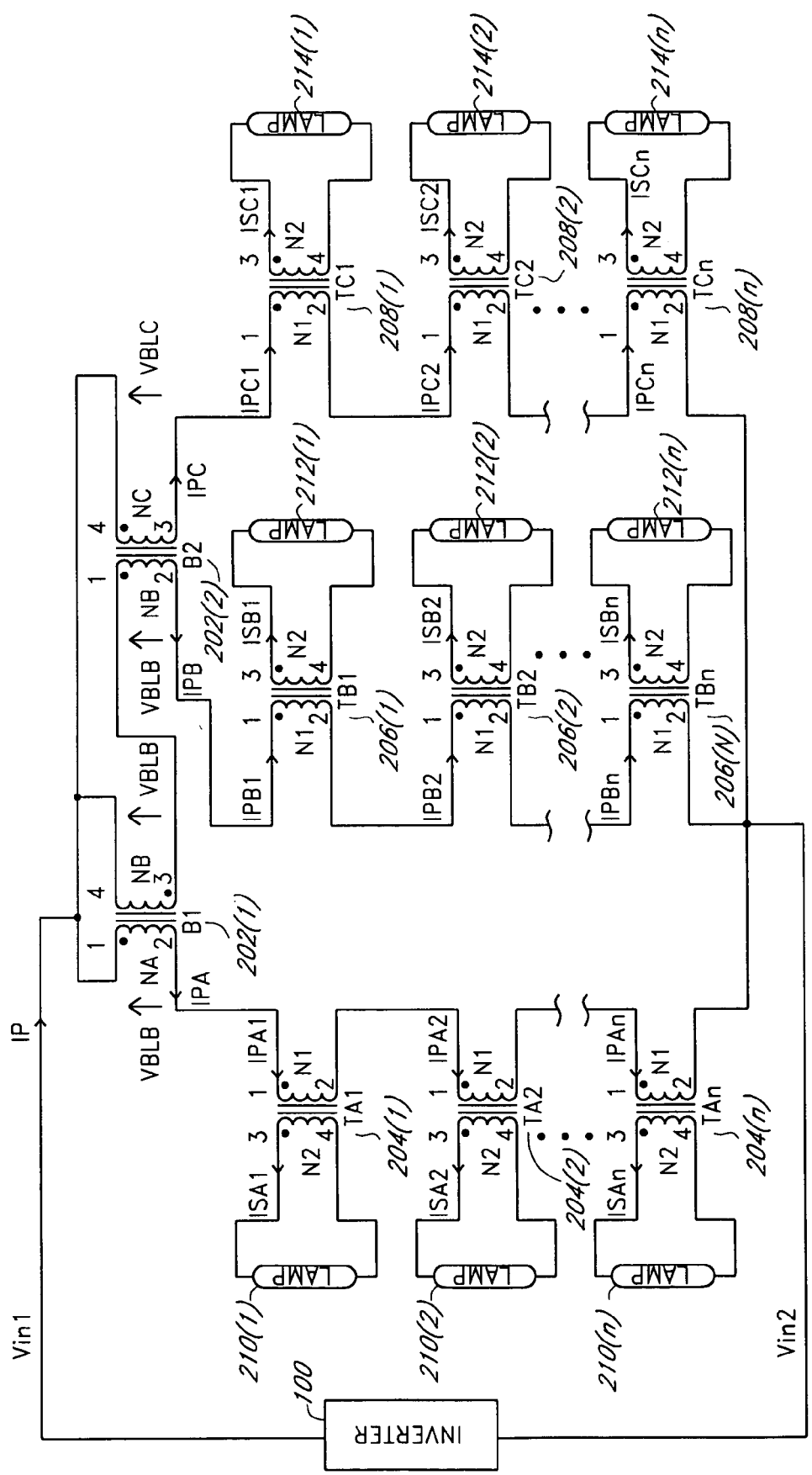
FIG. 2A illustrates one embodiment of current balancing among three groups of series-connected lamp transformers using two balancing transformers in a cascaded configuration.
Figure 2B:
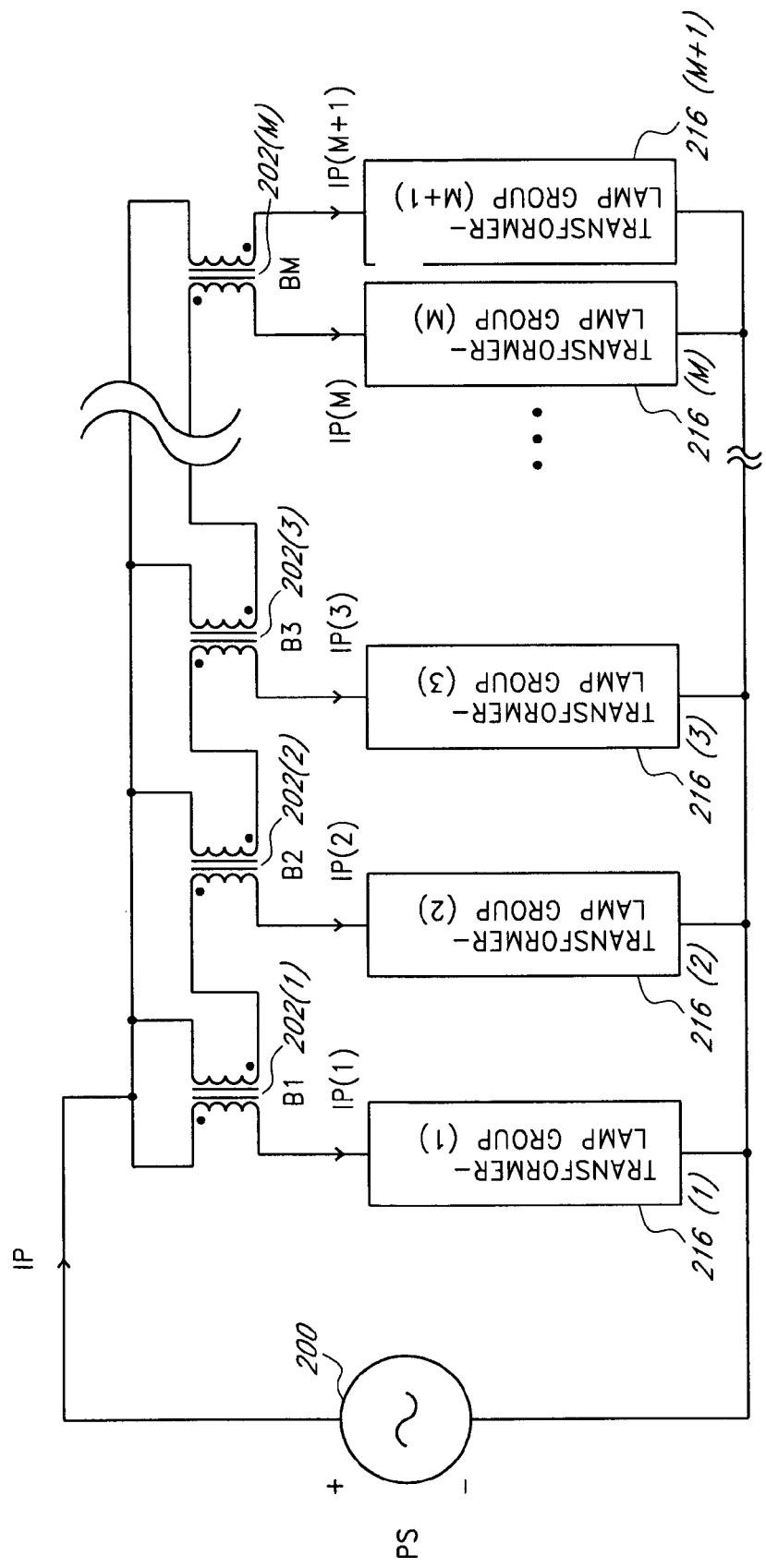
FIG. 2B illustrates one embodiment of current balancing among M+1 transformer-lamp groups using M balancing transformers in a cascaded configuration.

FIG. 2A illustrates one embodiment of current balancing among three groups of series-connected lamp transformers using two balancing transformers in a cascaded configuration. A first group of lamp transformers (TA1, TA2 ... TAn), shown as lamp transformers 204(1)–204(n) (collectively the lamp transformers 204), has primary windings coupled in series to conduct a first balanced primary current (IPA). A second group of lamp transformers (TB1, TB2 ... TBn), shown as lamp transformers 206(1)–206(n) (collectively the lamp transformers 206), has primary windings coupled in series to conduct a second balanced primary current (IPB). A third group of lamp transformers (TC1, TC2 ... TCn), shown as lamp transformers 208(1)–208(n) (collectively the lamp transformers 208), has primary windings coupled in series to conduct a third balanced primary current (IPC).

A first group of lamp loads shown as lamp loads 210(1)–210(n) (collectively the lamp loads 210) are coupled across respective secondary windings of the lamp transformers 204 in the first group. The lamp loads 210 conduct respective currents that are proportional to the first balanced primary current. A second group of lamp loads shown as lamp loads 212(1)–212(n) (collectively the lamp loads 212) are coupled across respective secondary windings of the lamp transformers 206 in the second group. The lamp loads 212 conduct respective currents that are proportional to the second balanced primary current. A third group of lamp loads shown as lamp loads 214(1)–214(n) (collectively the lamp loads 214) are coupled across respective secondary windings of the lamp transformers 208 in the third group. The lamp loads 214 conduct respective currents that are proportional to the third balanced primary current. The lamp loads 210, 212, 214 can have different configurations (e.g., one or more lamps in a parallel or a series configuration).

In one embodiment, the three groups of lamp transformers 204, 206, 208 are arranged in a parallel configuration and coupled to a common power source (e.g., an inverter 100) through two balancing transformers shown as balancing transformers 202(1)–202(2) (collectively the balancing transformers 202). The balancing transformers 202 are arranged in a cascaded configuration to divide a common current (IP) from the common power source 100 into the three balanced primary currents. For example, a first balance winding of the first balancing transformer 202(1) is coupled in series with the primary windings of the first group of lamp transformers 204 between an input node (Vin1) and a reference node (Vin2) of the common power source 100. A second balance winding of the first balancing transformer 202(1) is coupled in series (or cascaded) with a first balance winding of the second balancing transformer 202(2). The cascaded balance windings are coupled in series with the primary windings of the second group of lamp transformers 206 between the input node and the reference node of the common power source 100. Finally, a second balance winding of the second balancing transformer 202(2) is coupled in series with the primary windings of the third group of lamp transformers 208 between the input node and the reference node of the common power source 100.

The first balance winding and the second balance winding for each of the balancing transformers 202 are coupled in anti-phase relationship between the common power source and the respective groups of lamp transformers 204, 206, 208. The cascaded balance windings are coupled in reverse polarity. The first balance winding of the first balancing transformer 202(1) conducts the first balanced primary current. The cascaded balancing windings conduct the second balanced primary current. The second balance winding of the second balancing transformer 202(2) conducts the third balanced primary current. Additional groups of lamp transformers can be accommodated by further cascading of additional balancing transformers as shown in FIG. 2B.

FIG. 2B illustrates one embodiment of current balancing among M+1 transformer-lamp groups using M balancing transformers in a cascaded configuration. A common power source (PS) 200 supplies power to the M+1 transformer-lamp groups shown as transformer-lamp groups 216(1)–216(m+1) (collectively the transformer-lamp groups 216). The transformer-lamp groups 216 are arranged in a parallel configuration and are coupled to the common power source 200 via the M balancing transformers (B1, B2 . . . Bm) shown as balancing transformers 202(1)–202(m) (collectively the balancing transformers 202).

The balancing transformers 202 are arranged in a cascaded configuration to generate M+1 balanced primary currents from an input current (IP) supplied by the common power source 200. Each of the balancing transformers 202 have two balance windings coupled in anti-phase relationship between the common power source 200 and the respective transformer-lamp groups 216. The first balancing transformer 202(1) has a first balance winding coupled between the common power source 200 and the first transformer-lamp group 216(1). A second balance winding of the first balancing transformer 202(1) is coupled in series and in reverse polarity with a first balance winding of a second balancing transformer 202(2) to form first cascaded windings between the common power source 200 and the second transformer-lamp group 216(2). A second balance winding of the second balancing transformer 202(2) is coupled in series and in reverse polarity with a first balance winding of a third balancing transformer 202(3) to form second cascaded windings between the common power source 200 and the third transformer-lamp group 216(3). Cascaded windings are similarly formed for the remaining transformer-lamp groups 216 except for the last transformer-lamp group 216(m+1) which is coupled to the common power source via the second balance winding of the last balancing transformer 202(m).

The first balance winding of the first balancing transformer 202(1), the cascaded windings, and the second balance winding of the last balancing transformer 202(m) provide balanced primary currents for the respective transformer-lamp groups 216. In one embodiment, the first balance winding and the second balance winding for each of the balancing transformers 202 have substantially equal number of turns to generate substantially equal balanced primary currents. The first balance winding and the second balance winding for one or more of the balancing transformers 202 can have different number of turns to generate proportional balanced primary currents.

Each of the transformer-lamp groups 216 includes a plurality of lamp transformers with primary windings coupled in series to conduct one of the balanced primary currents. Secondary windings of the lamp transformers are coupled to respective lamp loads. Each of the lamp loads includes one or more lamps (e.g., fluorescent lamps or CCFLs). The secondary windings conduct currents that are proportional to the balanced primary currents conducted by the corresponding primary windings. In one application, the lamp transformers within the same transformer-lamp group can have substantially identical transformer turns ratios such that the currents conducted by the respective secondary windings are substantially identical. Alternately, the lamp transformers within the same transformer-lamp group can have different transformer turns ratios such that the currents conducted by the respective secondary windings are proportional to each other.

Figure 3A:
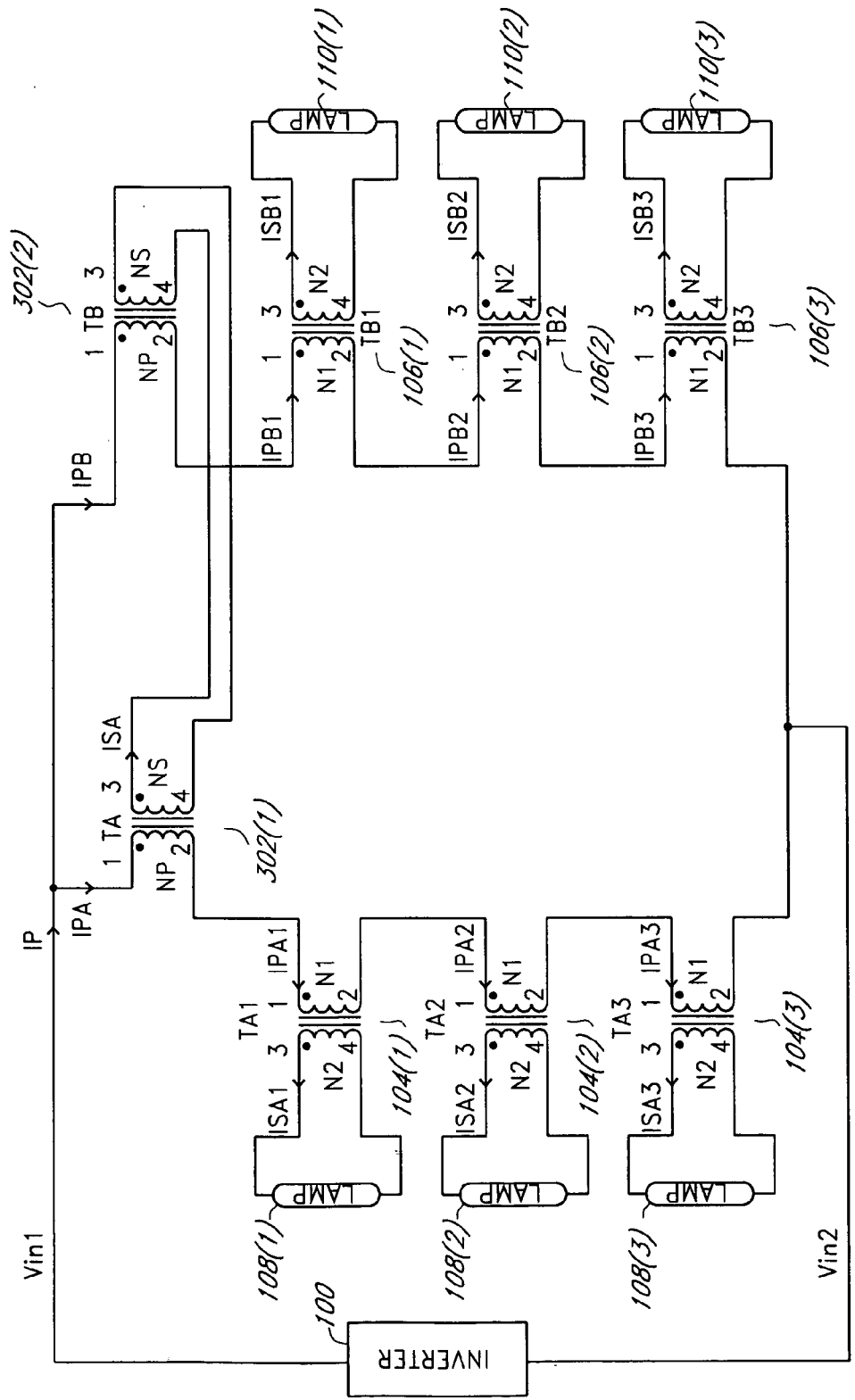
FIG. 3A illustrates one embodiment of current balancing between two branches of series-connected lamp transformers using a ring balancer.

FIG. 3A illustrates one embodiment of current balancing between two branches (or groups) of series-connected lamp transformers using a ring balancer. By way of example, the embodiment shown in FIG. 3A is substantially similar to the embodiment shown in FIG. 1 except the balancing transformer 102 in FIG. 1 is replaced with two balancing transformers arranged in a ring balancing configuration (or as a ring balancer). The two balancing transformers shown as balancing transformers 302(1), 302(2) (collectively the balancing transformers 302) divide a common input current (IP) into two balanced currents (IPA, IPB) for the respective groups of lamp transformers 104, 106.

A separate balancing transformer is used for each lamp transformer group. For example, a first balance winding of the first balancing transformer 302(1) conducts the first balanced current (IPA) and is couple in series with the serially-coupled primary windings of the lamp transformers 104 in the first group. A first balance winding of the second balancing transformer 302(2) conducts the second balanced current (IPB) and is coupled in series with the serially-coupled primary windings of the lamp transformers 106 in the second group. The second balance windings of the balancing transformers 302 are coupled in series and in phase to form a closed loop (or a shorted-circuit loop).

During normal operation, a circulation current develops and flows in the closed loop through the second balance windings of the balancing transformers 302. The first balance windings of the balancing transformers 302 conduct currents proportional to the circulation current in accordance with the respective balancing transformer turns ratios. Thus, the circulation current can force the first balance windings of the balancing transformers 302 to conduct substantially equal currents and thereby each of the lamp transformer groups to conduct substantially equal currents.

The operating principle of the ring balancer advantageously does not require a high number of turns for the second balance windings in the closed loop in order to have sufficient inductance to yield a small balancing error. The second balance windings can use any number of turns in theory provided that the wire gauge is sufficient to handle the magnitude of the circulation current. The ring balancer works given sufficient number of turns in the first balance windings of the balancing transformers 302. The sufficient number of turns in the first balance windings of the ring balancer is significantly lower than the number of turns in windings of prior art balancing transformers. The reduction in the number of turns in the first balance windings of the ring balancer is due to lower balancing voltages and higher magnitude currents on the first balance windings. Thus, the ring balancer can be constructed easily and cost-effectively. Further details on the operating principle of the ring balancer are discussed in commonly-owned pending U.S. application Ser. No. 10/958,668, entitled "A Current Sharing Scheme for Multiple CCF Lamp Operation," and U.S. application Ser. No. 10/959,667, entitled "Balancing Transformers for Ring Balancer," which are hereby incorporated by reference herein.

Figure 3B:
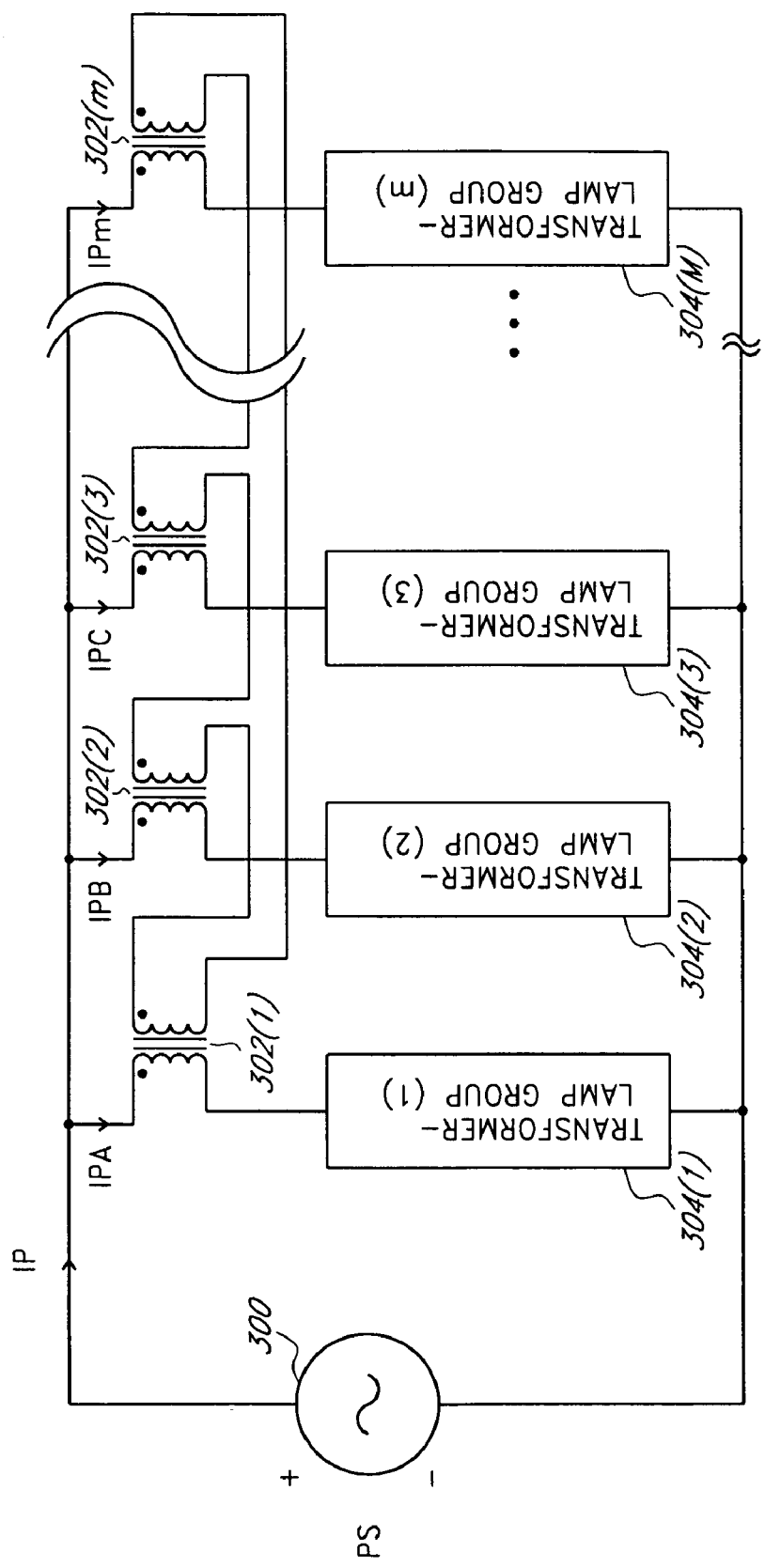
FIG. 3B illustrates one embodiment of current balancing among M transformer groups using M balancing transformers in a ring balancing configuration.

FIG. 3B illustrates one embodiment of current balancing among M transformer groups, shown as transformer groups 304(1)–304(m) (collectively the transformer groups 304), using M balancing transformers, shown as balancing transformers 302(1)–302(m) (collectively the balancing transformers 302), in a ring balancing configuration. The transformer groups 304 are arranged in a parallel configuration and coupled to a common power source (PS) 300 through the respective balancing transformers 302. For example, the balancing transformers 302 have first balance windings coupled between the common power source 300 and the respective transformer groups 304. The balancing transformers 302 have second balance windings coupled in a serial closed loop to conduct a common loop current and thereby facilitate matched or controlled currents in the respective first balance windings.

Figure 4A:
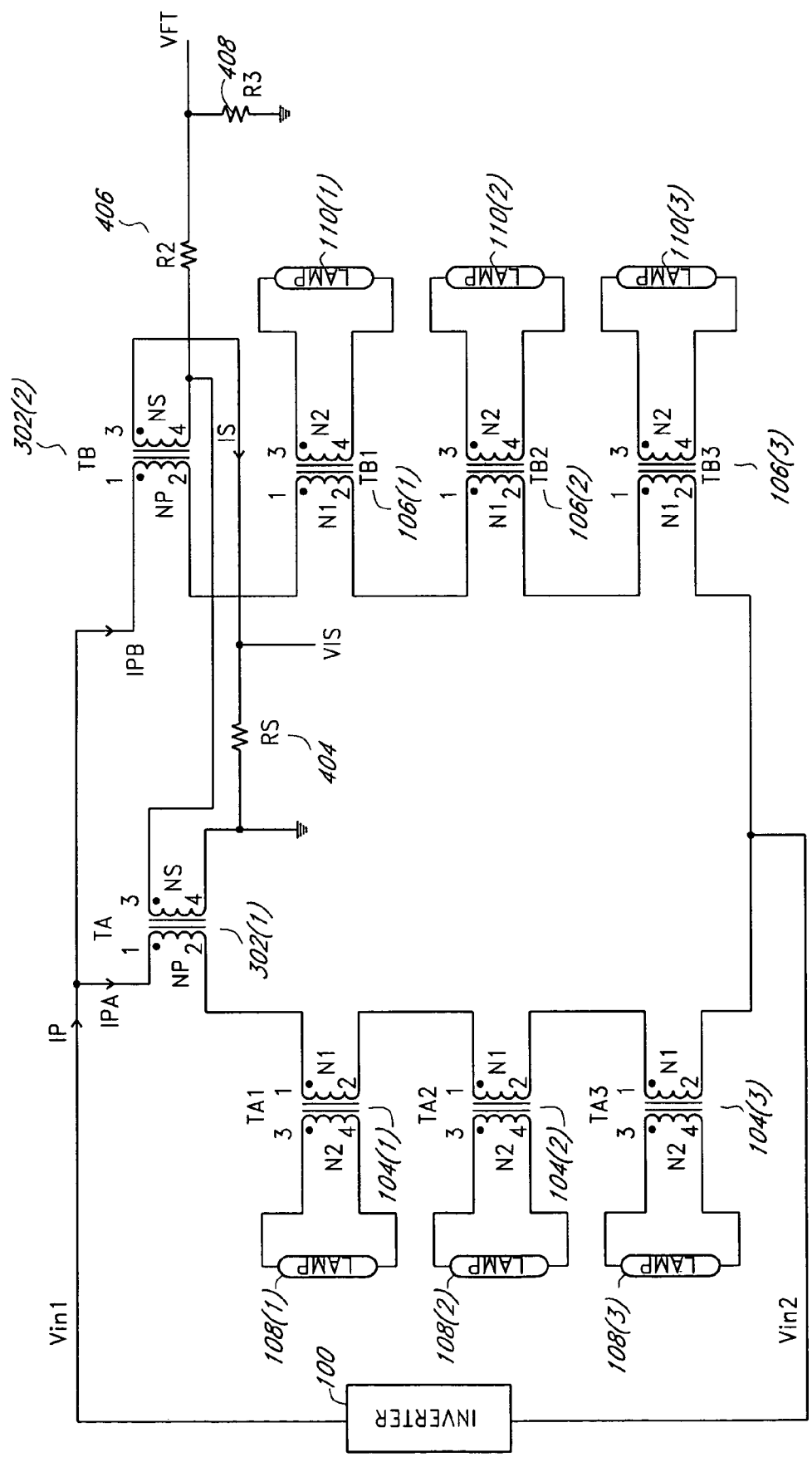
FIG. 4A illustrates one embodiment of sensing current and detecting fault conditions using the ring balancer illustrated in FIG. 3A.

One advantage of a ring balancer (or a ring balancing configuration) is the ability to sense current or detect fault conditions using the closed loop of second balance windings. FIG. 4A illustrates one embodiment of sensing current and detecting fault conditions using the ring balancer illustrated in FIG. 3A. The ring balancer acts as a current transformer with currents flowing through first balance windings of the balancing transformers 302 proportional to a common current (IS) flowing through the closed loop of second balance windings in accordance with respective transformer turns ratios. By inserting a sensing resistor (RS) 404 in series with the closed loop of second balance windings, a sense signal (VIS) can be derived to facilitate current load regulation or overload protection of a backlight system with reduced or no additional cost. For example, the sense signal can be the voltage drop across the sensing resistor 404 which is proportional to the common current flowing through the closed loop of second balance windings as well as currents conducted by the first balance windings. In the embodiment shown in FIG. 4A, a first terminal of the sensing resistor 404 is coupled to a virtual ground (or earth ground) and a second terminal of the sensing resistor 404 provides the sense signal.

Fault conditions (e.g., a shorted circuit condition or an open circuit condition) in one or more of the lamp transformer groups can be detected using the ring balancer. For example, when a shorted circuit or an open circuit condition occurs in one of the lamp transformer groups (or branches), a relatively high magnitude voltage (or fault voltage) develops in the second balance winding of the corresponding balancing transformer. In one embodiment, a fault detection network is coupled to the closed loop of second balance windings to generate a fault detection signal (VFT) during fault conditions. The fault detection signal is used as a fault indication signal to cause a fault detection circuit to take appropriate actions to protect the backlight system (e.g., by turning off the inverter 100). In the embodiment illustrated in FIG. 4A, the fault detection network comprises a first resistor (R2) 406 and a second resistor (R3) 408 coupled as a voltage-divider to a node in the closed loop to sense fault voltages in the second balance windings.

An additional feature of using the ring balancer is the ability to reduce current in a shorted lamp transformer group. For example, a voltage in anti-phase relationship with the input voltage develops in a first balance winding of a balancing transformer to reduce the current of a corresponding lamp transformer group when the lamp transformer group is shorted to ground.

Figure 4B:
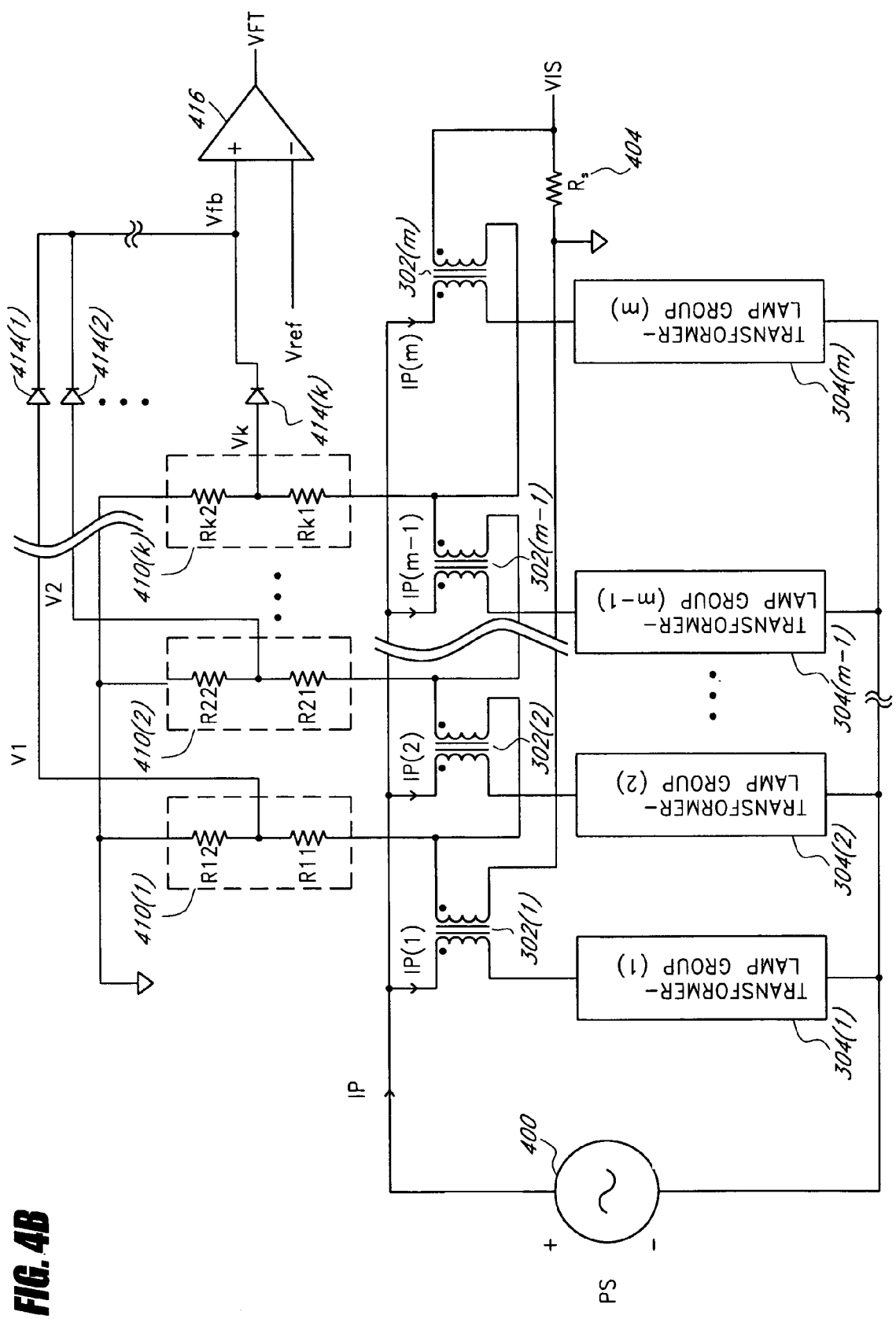
FIG. 4B illustrates one embodiment of sensing current and detecting fault conditions in the ring balancing configuration of FIG. 3B.

FIG. 4B illustrates one embodiment of sensing current and detecting fault conditions in the ring balancing configuration of FIG. 3B in which more than two balancing transformers 302 are used in the ring balancer. Similar to the configuration shown in FIG. 4A, a sensing resistor (RS) 404 is inserted in series with the closed loop of second balance windings to sense current. A fault detection circuit monitors voltages at the second balance windings of the balancing transformers 302 to detect transformer groups 304 with non-operating conditions. The voltage at the second balance windings can be monitored to detect open circuit or shorted circuit conditions. For example, when one of the transformer groups 304 has an open circuit condition, voltages across the first balance winding and the second balance winding of the corresponding balancing transformer rise significantly. When one of the transformer groups 304 has a shorted circuit condition, voltages in balance windings of balancing transformers associated with operational transformer groups rise. A level detection circuit can be used to detect the rising voltages to determine the fault condition.

In one embodiment, open circuit conditions and shorted circuit conditions can be distinctly detected by sensing voltages at the second balance windings of the balancing transformers 302 and comparing the sensed voltages to a predetermined threshold. In FIG. 4B, voltages at the second balance windings are sensed with respective resistor dividers shown as resistor dividers 410(1)–410(k) (collectively the resistor dividers 410). The resistor dividers 410, each comprising a pair of resistors connected in series, are coupled between predetermined terminals of the respective second balance windings and ground (or a reference node). The common nodes between the respective pairs of resistors provide senses voltages (V1, V2 . . . Vk) which are provided to a combining circuit. In one embodiment, the combining circuit includes a plurality of isolation diodes shown as isolation diodes 414(1)–414(k) (collectively the isolation diodes 414). The isolation diodes 414 form a diode OR-ed circuit with anodes individually coupled to the respective sensed voltages and cathodes commonly connected to generate a feedback voltage (Vfb) corresponding to the highest sensed voltage.

In one embodiment, the feedback voltage is provided to a positive input terminal of a comparator 416. A reference voltage (Vref) is provided to a negative input terminal of the comparator 416. When the feedback voltage exceeds the reference voltage, the comparator 416 outputs a fault signal (VFT) to indicate presence of one or more non-operating transformer groups. The fault signal can be used to turn off the common power source 400.

The fault detection circuit described above advantageously is not in the direct paths of current flowing from the common power source 400 to the transformer groups 304, thus reducing the complexity and cost associated with this feature. It should be noted that many different types of fault detection circuits can be designed to detect fault conditions by monitoring the voltages at the second balance windings of the balancing transformers 302.

Figure 5:
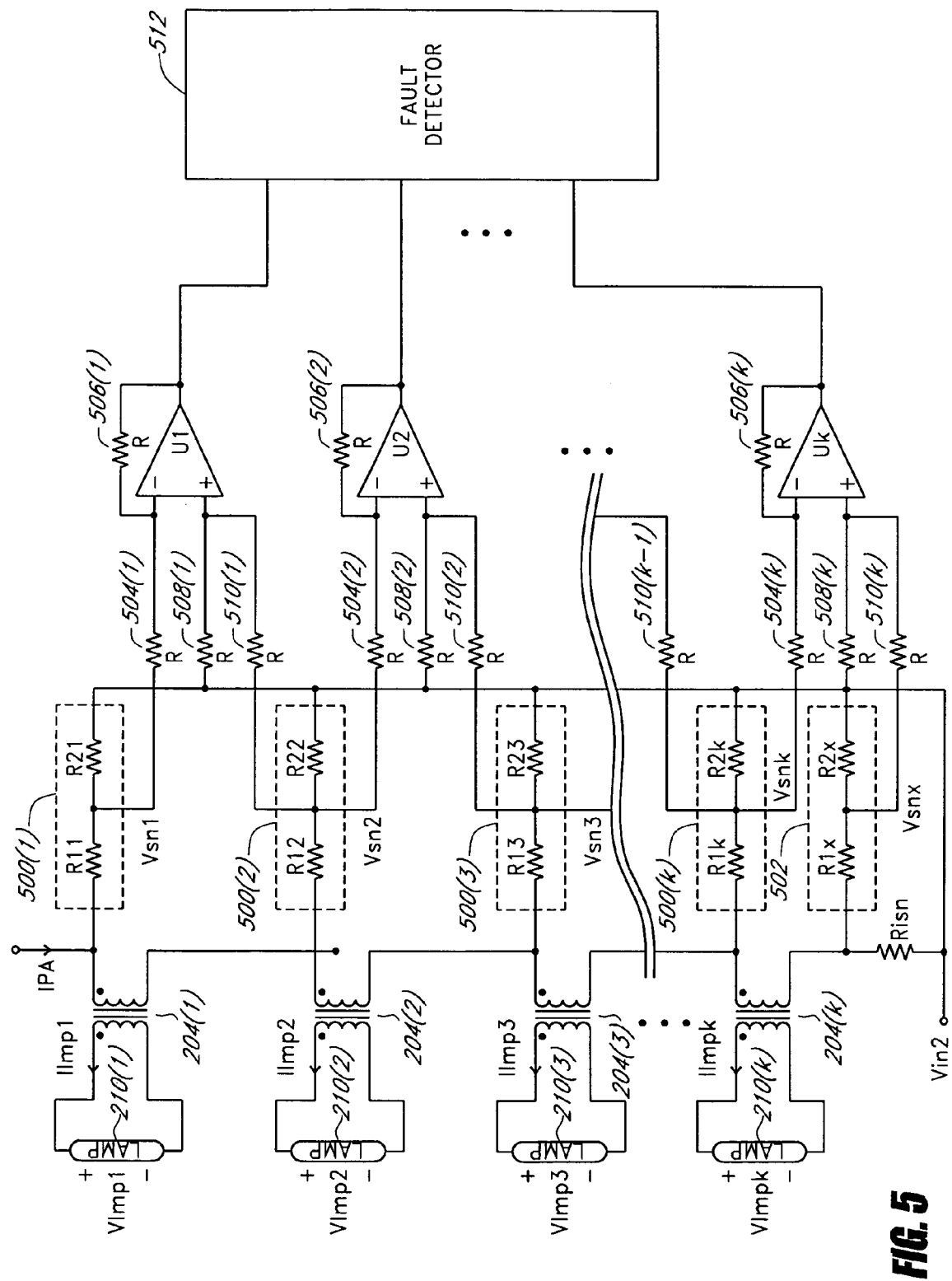
FIG. 5 illustrates one embodiment of sensing fault conditions within a transformer group.

FIG. 5 illustrates one embodiment of sensing fault conditions within a transformer group. By way of example, a lamp load fault detection circuit is illustrated for the first group of lamp transformers 204 shown in FIG. 2A. Similar lamp load fault detection circuits can be used for the other groups of lamp transformers. As described above, the lamp transformers 204 in the first group have primary windings coupled in series between the first balance of the first balancing transformer 202(1) and the referenced node (Vin2) to conduct the first balanced primary current (EPA). The lamp loads 210 are coupled across the respective secondary windings of the lamp transformers 204. Fault conditions (e.g., open circuit or shorted circuit of the lamp loads 210) can be detected by sensing voltage amplitude changes across the primary windings of the lamp transformers 204.

In the embodiment illustrated in FIG. 5, a plurality of resistive voltage divider networks shown as voltage dividers 500(1)–500(k) (collectively the voltage dividers 500) are coupled between different nodes of the serially-coupled primary windings of the lamp transformers 204 and the reference node. The voltage dividers 500 generate respective sense voltages (Vsn1–Vsnk) which are provided in pairs to differential amplifiers for monitoring voltages across the respective primary windings of the lamp transformers 204. In one embodiment, a current sensing resistor (Risn) is inserted between a second terminal of the last lamp transformer 204(k) and the reference node. An additional voltage divider 502 is coupled between the second terminal of the last lamp transformer 204(k) and the reference node to generate an additional sense voltage (Vsnx) in that case.

In one embodiment, each differential amplifier includes an operational amplifier and four resistors. A feedback resistor 506 is coupled between an inverting input and an output of the operational amplifier. A bias resistor 508 is coupled between a non-inverting input of the operational amplifier and the reference node. A first series resistor 504 is coupled between the inverting input of the operational amplifier and a sense voltage corresponding to a first terminal of a select primary winding. A second series resistor 510 is coupled between the non-inverting input of the operational amplifier and a sense voltage corresponding to a second terminal of the selected primary winding.

In one embodiment, the lamp transformers 204 have substantially identical transformer turns ratios and voltages across each primary winding of the lamp transformers 204 are substantially equal during normal operating conditions. Accordingly, the outputs of the differential amplifiers are substantially equal during normal operating conditions. During abnormal operating conditions (e.g., when a lamp load is open or shorted), the voltages across one or more of the primary windings change significantly. For example, when a lamp load is shorted, voltages across the primary and secondary windings of the corresponding lamp transformer drop (or decrease) significantly in an attempt to continue conducting the balanced primary current. Voltages across the primary windings of the remaining lamp transformers rise (or increase) to compensate for the voltage decrease in the lamp transformer with the shorted lamp load.

On the other hand, when a lamp load has an open circuit condition, voltages across the primary and secondary windings of the corresponding lamp transformer rise to an upper limit in an attempt to continue conducting the balanced primary current. The maximum level is limited by the saturation of the transformer core. Consequently, voltages across the primary windings of the remaining lamp transformers drop and currents provided to the remaining lamp loads are reduced accordingly.

In the embodiment illustrated in FIG. 5, the outputs of the differential amplifiers are provided to a fault detector circuit 512 to detect changes in the voltages across the primary windings of the respective lamp transformers 204. For example, the outputs can be provided to window comparators to detect abnormal rises in voltage amplitudes. The fault detector circuit 512 can generate control signals in response to protect a backlight system (e.g., by shutting down the inverter 100).

Various embodiments have been described above. Although described with reference to these specific embodiments, the descriptions are intended to be illustrative and are not intended to be limiting. For example, the number of transformer groups is not limited to two or three as shown in some of the figures. Any number of transformer groups (or branches) can operate with balanced currents in accordance with the present invention. In addition, the number of lamp transformers in each transformer group is no limited to three as illustrated in some figures. Furthermore, the currents conducted by the respective transformer groups can be controlled to be proportional to each other, rather than equal to each other, by using different turns ratios for the balancing transformers. It should also be noted that the application of these inventions is not limited to multiple CCFL operations. The inventions apply to other types of loads in which multiple loads are connected to a common AC source in a parallel configuration and current sharing among the loads is desired. Various modifications and applications may occur to those skilled in the art without departing from the true spirit and scope of the invention as defined by the appended claims.

What is claimed is:

1. A backlight system comprising:
M transformer groups in an electrically parallel configuration, wherein M is at least two and each transformer group comprises at least two lamp transformers with serially-coupled primary windings;
a plurality of lamp loads, wherein the lamp loads are coupled to respective secondary windings of the lamp transformers; and
at least M−1 balancing transformers coupled between a common power source and the M transformer groups, wherein each balancing transformer comprises two balance windings and the serially-coupled primary windings of each transformer group are coupled in series with at least one balance winding to the common power source.

2. The backlight system of claim 1, wherein the lamp transformers have approximately equal transformer turns ratios.

3. The backlight system of claim 1, wherein each lamp load comprises one or more cold cathode fluorescent lamps coupled in series or in parallel.

4. The backlight system of claim 1, wherein each of the balance windings of the balancing transformers have approximately the same number of turns.

5. The backlight system of claim 1, wherein M is two and balance windings of the balancing transformer are coupled in reverse polarity between the common power source and the respective transformer groups.

6. The backlight system of claim 1, wherein M is more than two and the balancing transformers are arranged in a cascaded configuration such that M—2 transformer groups are each coupled in series with two balance windings from different balancing transformers to the common power source, wherein the two balance windings are coupled in series and in an anti-phase relationship.

7. The backlight system of claim 1, further comprising a lamp fault detection circuit configured to sense increases in voltage amplitudes across the respective primary windings of the lamp transformers.

8. The backlight system of claim 1, wherein M balancing transformers have first balance windings respectively coupled between the common power source and the M transformer groups and second balance windings coupled in a serial closed loop.

9. The backlight system of claim 8, further comprising a sense resistor in the serial closed loop.

10. The backlight system of claim 8, further comprising a group fault detection circuit configured to sense a rise in voltage amplitude across one or more of the second balance windings.

11. A method to balance currents among multiple lamps in a backlight system, the method comprising the acts of:
arranging a plurality of lamp transformers into an electrically parallel configuration of M transformer groups, wherein each transformer group comprises at least two lamp transformers and primary windings of the lamp transformers in a common transformer group are coupled in series;
coupling different lamp loads to respective secondary windings of the lamp transformers; and
using at least M−1 balancing transformers to interface the electrically parallel configuration of M transformer groups to a common power source, wherein each balancing transformer comprises two balance windings and each transformer group is coupled in series with at least one balance winding to the common power source.

12. The method of claim 11, wherein the lamp transformers have substantially equal turns ratios and each balance winding has substantially the same number of turns.

13. The method of claim 11, wherein balance windings of a common balancing transformer are coupled between the common power source and respective transformer groups in an anti-phase relationship.

14. The method of claim 11, wherein M balancing transformers are arranged in a ring balancing configuration with respective first balance windings coupled in series with a different transformer group and respective second balance windings coupled in a serial loop.

15. The method of claim 11, further comprising the act of sensing an amplitude increase in voltage across one or more balance windings to detect fault conditions.

16. The method of claim 11, further comprising the act of sensing an amplitude rise in voltage across one or more primary windings of the lamp transformer to detect fault conditions.

17. A backlight system comprising means for balancing currents among multiple lamps using one or more balancing transformers to divide a common current into multiple branches of balanced currents and groups of lamp transformers to conduct the respective balanced currents, wherein primary windings of the lamp transformers in each group are coupled in series and the lamps are coupled to secondary windings of the lamp transformers.

18. The backlight system of claim 17, wherein each of the balancing transformers have a first balance winding and a second balance winding and the plurality of balancing transformers are arranged in a cascaded configuration such that a first balance winding of one balancing transformer is coupled to a second balance winding of another balancing transformer in an anti-phase relationship.

19. The backlight system of claim 17, wherein each of the balancing transformers have a first balance winding and a second balance winding, the first balance windings are coupled between a common power source and the respective groups of lamp transformers, and the second balance windings are coupled in a serial loop.

20. The backlight system of claim 17, further comprising means for detecting fault conditions by sensing changes in voltage amplitudes across the primary windings of the lamp transformers or across balance windings of the balancing transformers.

* * * * *